No. 856,501. PATENTED JUNE 11, 1907.
C. WESP.
VEHICLE SPRING.
APPLICATION FILED OCT. 15, 1906.
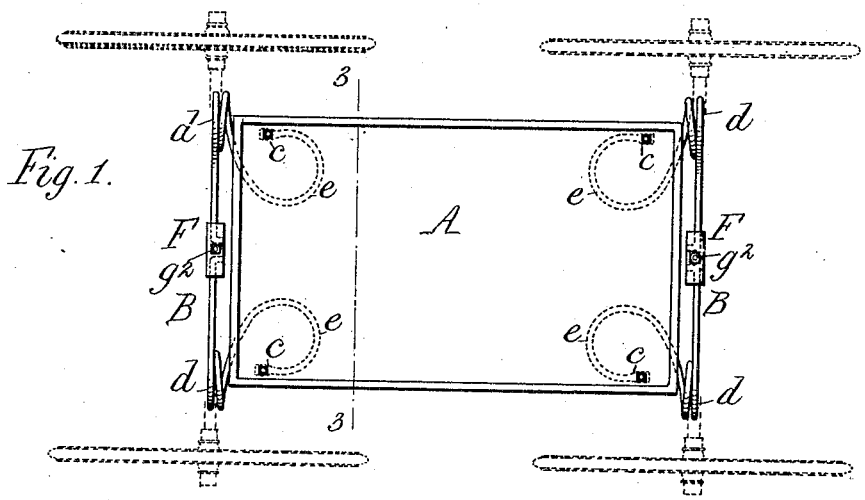
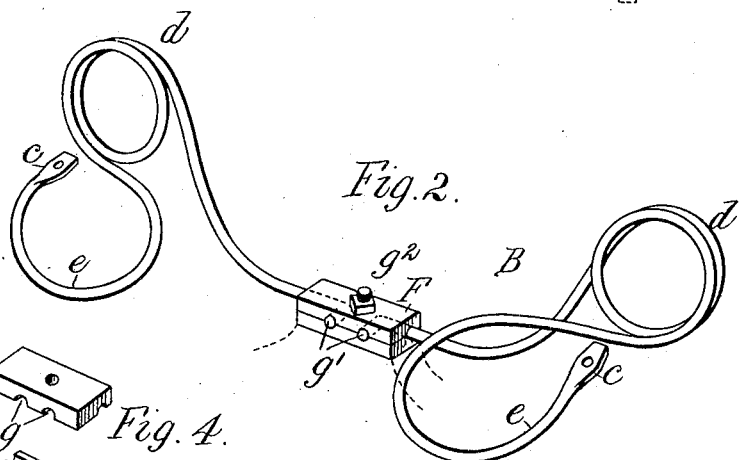
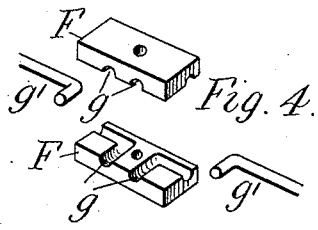
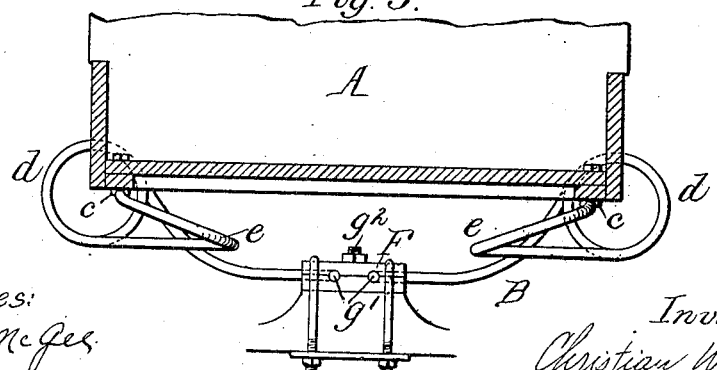
Witnesses:
A. L. McGee.
A. G. Dimond.
Inventor.
Christian Wesp
By Wilhelm Parker & Hard
Attorneys.

UNITED STATES PATENT OFFICE.

CHRISTIAN WESP, OF BUFFALO, NEW YORK.

VEHICLE-SPRING.

No. 856,501.     Specification of Letters Patent.     Patented June 11, 1907.

Application filed October 15, 1906. Serial No. 338,947.

*To all whom it may concern:*

Be it known that I, CHRISTIAN WESP, a citizen of the United States, residing at Buffalo, in the county of Erie and State of New York, have invented a new and useful Improvement in Vehicle-Springs, of which the following is a specification.

This invention relates more particularly to improvements in vehicle springs of that class known as "torsion springs." Springs of this character have heretofore most commonly been pivotally attached to the running gear of the vehicle, as, owing to the construction of the springs, a rigid connection would tend to greatly interfere with their free movement. It has also been found difficult to provide a rigid connection which could withstand the twisting and crowding or spreading action of the springs.

The object of this invention is to overcome the objections to the present torsion springs and provide a spring which will be resilient and insure an easy riding, comfortable vehicle, free from objectionable sidewise oscillation, and which will be of such construction that the peculiar strains on springs of this character which would be liable to break or derange the spring or its fastening devices, will be in a large measure eliminated. This object is attained by forming the spring with torsion coils or loops upon which the vehicle body rests, and with upright spring coils between these torsion coils or loops and the central part of the spring which is fastened to the running gear. These upright coils tend to absorb or contract to a large extent the twisting and crowding or spreading action of the spring and prevent the transmission of the same to the central portion of the spring. The device for securing this central portion of the spring to the running gear will thus be subjected principally to downward pressure and will be freed to a large extent from any sidewise twisting strain. It is, therefore, possible to secure the spring rigidly to the running gear of the vehicle by a simple device without interfering with its freedom of movement.

In the accompanying drawings: Figure 1 is a plan view of a vehicle body equipped with springs embodying the invention, showing the running gear by broken lines. Fig. 2 is a perspective view of one of the springs and its attaching device removed from the vehicle. Fig. 3 is a vertical sectional elevation of the vehicle body and one spring, in line 3—3, Fig. 1. Fig. 4 is a perspective view of the attaching device showing the parts thereof separated and the ends of the springs in position for insertion therein.

Like letters of reference refer to like parts in the several figures.

A represents the body or box of a vehicle and B B the springs. The springs are arranged crosswise of the vehicle at the ends of the body. They are made of spring metal preferably round in cross-section and are secured centrally to the running gear, one to the head block and the other to the rear axle, by suitable clamps or attaching devices, while their outer ends are bolted or otherwise suitably secured to the bottom of the vehicle body at $c$ adjacent to the opposite sides thereof. The front and rear springs are alike, but oppositely arranged, and a description of one will suffice. The main part of the spring extends outwardly in opposite directions and curves upwardly from its point of attachment to the head block or axle to points adjacent to the sides of the vehicle body, where double coils $d$ are formed which stand substantially upright over the axle or head block. From the lower sides of these coils $d$ the arms of the spring curve in a substantially horizontal direction inwardly and away from the plane of the coils, and then in an upwardly direction outwardly and toward the coils to their points of attachment to the body of the vehicle, thus forming torsion coils or loops $e$ beneath the vehicle body. When the spring is under the action of weight in the vehicle body or downward pressure, the torsion coils $e$ will flatten more or less and the upwardly curved arms of the spring between the upright coils $d$ will straighten out more or less, the upright coils contracting sufficiently to allow the necessary extension of the spring sidewise of the vehicle. The twisting strain on the torsion coils is largely absorbed by the upright coils $d$ and is only communicated in slight degree to the central portion of the spring between these latter coils. This portion of the spring and its securing device are therefore less liable to be broken or torn loose. The springs formed as shown have long arms and while they will therefore afford a very resilient and easy support for the vehicle body, the conjoint action of the torsion and upright coils will prevent such undue flexibility or unstability as to allow objectionable sidewise rocking or oscillation of the body.

The spring gear is above described as consisting of two springs, one in front and one in rear of the body. Each of these springs could be made of a single continuous spring rod bent into the form described, but it is preferably composed of two sections or halves, as shown, joined together by a clamp or connecting device F. This device, in the construction shown, consists of two blocks or pieces provided with angular grooves $g$ in their meeting faces which form seats for the inner ends $g^1$ of the spring sections which are bent at an angle to fit the seats. The clamp blocks can be secured together to hold the spring sections and also fastened to the axle or head block by a bolt $q^2$, ordinary clips, or other fastening means. By this manner of making and attaching the spring it will be firmly held from twisting on the axle or head block, and it can also be manufactured with greater facility. The term "spring" in the singular in this specification is therefore employed to indicate the spring device having the two upright and torsion coils with the connecting part, whether made in one single piece or in two sections.

I claim as my invention:

1. A vehicle spring which has a central portion for attachment to the running gear, substantially horizontal torsion coils or loops at its opposite ends for attachment to the vehicle body, and substantially upright coils between said torsion coils or loops, substantially as set forth.

2. A vehicle spring which is attached at its central portion to the vehicle running gear and at opposite ends to the vehicle body, and is provided between said points of attachment with substantially upright coils and with torsion coils or loops, substantially as set forth.

3. The combination with the body and running gear of a vehicle, of springs arranged crosswise of the vehicle, said springs having central portions secured to the running gear, torsion coils or loops below the body and secured thereto, and substantially upright coils in front and rear of the body, substantially as set forth.

4. The combination with the body and running gear of a vehicle, of springs arranged crosswise of the vehicle and secured between their ends to the running gear and at their ends to the body, each spring consisting of two separate sections and connecting means, and each spring section having a torsion coil or loop located beneath the vehicle body and a substantially upright coil between said torsion coil or loop and the attachment of the spring to the running gear, substantially as set forth.

5. A vehicle spring composed of two separate sections, and means connecting said sections at the central portion of the spring, said spring having torsion coils or loops at its ends, and substantially upright coils between said torsion coils or loops and said connecting means, substantially as set forth.

6. The combination with the body and running gear of a vehicle, of springs arranged crosswise of the vehicle at either end thereof, said springs having central portions secured to the running gear, torsion coils secured to the body, and substantially upright coils arranged between said central portions and said torsion coils and in the vertical plane of said central portions, substantially as set forth.

Witness my hand, this 12th day of October, 1906.

CHRISTIAN WESP.

Witnesses:
   EDWARD C. HARD,
   A. L. McGEE.